March 28, 1967 A. J. DAVIS 3,310,978
FIBER OPTIC VIBRATION TRANSDUCER AND ANALYZER
Filed Oct. 21, 1964 6 Sheets-Sheet 1

FIG. 1

INVENTOR.
ALONZA J. DAVIS
BY *9H McCoy*
*Daniel B. Reece III*
ATTORNEYS

March 28, 1967   A. J. DAVIS   3,310,978
FIBER OPTIC VIBRATION TRANSDUCER AND ANALYZER
Filed Oct. 21, 1964   6 Sheets-Sheet 2

INVENTOR.
ALONZA J. DAVIS
BY
ATTORNEYS

INVENTOR.
ALONZA J. DAVIS

ATTORNEYS

March 28, 1967  A. J. DAVIS  3,310,978
FIBER OPTIC VIBRATION TRANSDUCER AND ANALYZER
Filed Oct. 21, 1964  6 Sheets-Sheet 4

INVENTOR.
ALONZA J. DAVIS
BY
ATTORNEYS

March 28, 1967 A. J. DAVIS 3,310,978
FIBER OPTIC VIBRATION TRANSDUCER AND ANALYZER
Filed Oct. 21, 1964 6 Sheets-Sheet 6

INVENTOR.
ALONZA J. DAVIS
BY
ATTORNEYS

United States Patent Office 3,310,978
Patented Mar. 28, 1967

3,310,978
FIBER OPTIC VIBRATION TRANSDUCER
AND ANALYZER
Alonza J. Davis, Huntsville, Ala., assignor to the United States of America as represented by the Administrator of the National Aeronautics and Space Administration
Filed Oct. 21, 1964, Ser. No. 405,630
17 Claims. (Cl. 73—70.2)

The invention described herein may be manufactured and used by or for the Government of the United States of America for governmental purposes without the payment of any royalties thereon or therefor.

This invention relates to a vibration detecting and indicating instrument, and more particularly to a vibratory instrument which employs fiber optical transducers or sensing elements coupled with a photo-electric analysis and control circuit for indicating both the frequency and amplitude of any vibration to which the instrument is subjected.

In the construction and testing of various types of mechanical devices, and especially those to be used in precision and very highly sophisticated systems, it is quite often necessary to test not only the frequency but also the amplitude of vibration encountered or produced during their operation. This is particularly true of those mechanical devices presently being developed and used in the aerospace field, especially so-called "flight hardware." Such flight hardware as, for example, gyroscopes, motors, pumps, etc. whose malfunction could result in a catastrophic disaster are extensively tested to assure that no correctable vibration is present in the finished item.

However, it is not only necessary that these flight components be tested under simulated flight conditions created in a laboratory, but their operation must often be monitored during an actual flight to determine their true operating characteristics. Thus, these reliability checks and double-checks necessary for "flight qualifying" critical items and systems for use in the aerospace industry has created a severe need for highly accurate, reliable, relatively inexpensive and light test instruments, particularly of the vibratory type.

The need for such vibratory instruments is especially critical where tests must be performed at a remote point on board a rocket powered launch vehicle or space probe which is in flight. Since such vehicles are usually unmanned, and the vibratory instrument must therefore be of the type that can be operated remotely, presently known types of vibratory instruments have been found to be generally unacceptable for such flight testing. This is particularly true of the so-called metal reed and stroboscopic type instruments. The use of these prior type instruments has been generally hampered by not only their power requirements, weight and size, which in most instances restricts their use on space vehicles where power, space and weight are premium items, but also by the broad telemetry band width needed to transmit the information produced by such instruments.

According to the present invention it has been found that a vibratory instrument can be constructed which incorporates substantially all the desirable features of both the so-called reed and stroboscopic type vibratory instruments while at the same time eliminating those undesirable features that have heretofore prevented their adaptation for use in the aerospace field. This novel vibratory instrument employs illuminated fiber optical spectrum transducers of the unloaded cantilevered beam type in combination with an optical mask, commutator, photo-electric analysis and control circuit to give a superior instrument that is particularly well adapted for remote operation. Furthermore, this novel instrument is not only very rugged, highly accurate and versatile, but is relatively small, light and inexpensive to manufacture.

Accordingly, a primary object of this invention is to provide a vibratory instrument that is highly reliable, accurate, versatile and rugged yet is light in weight, relatively inexpensive to manufacture, and requires only a narrow telemetry spectrum for remote operation.

Another object of this invention is to provide a vibratory instrument embracing all the desirable features of the reed and stroboscopic type vibratory instruments while at the same time excluding their undesirable characteristics.

Yet another object of this invention is to provide a vibratory instrument which employs a fiber optical spectrum transducer.

Yet still another object of this invention is to provide a vibratory instrument having fiber optical spectrum transducers which requires only a very narrow telemetry spectrum for proper operation and is, therefore, particularly adapted for remote operation.

Yet still a further object of this invention is to provide a vibratory instrument of an automatic or self-adjusting mechanical Q type which is especially adapted for making remote in-flight tests of both an aerospace vehicle and the equipment carried thereon.

These and other objects and advantages of this invention will be more apparent upon reference to the following specification, appended claims and drawing wherein:

Figure 1:
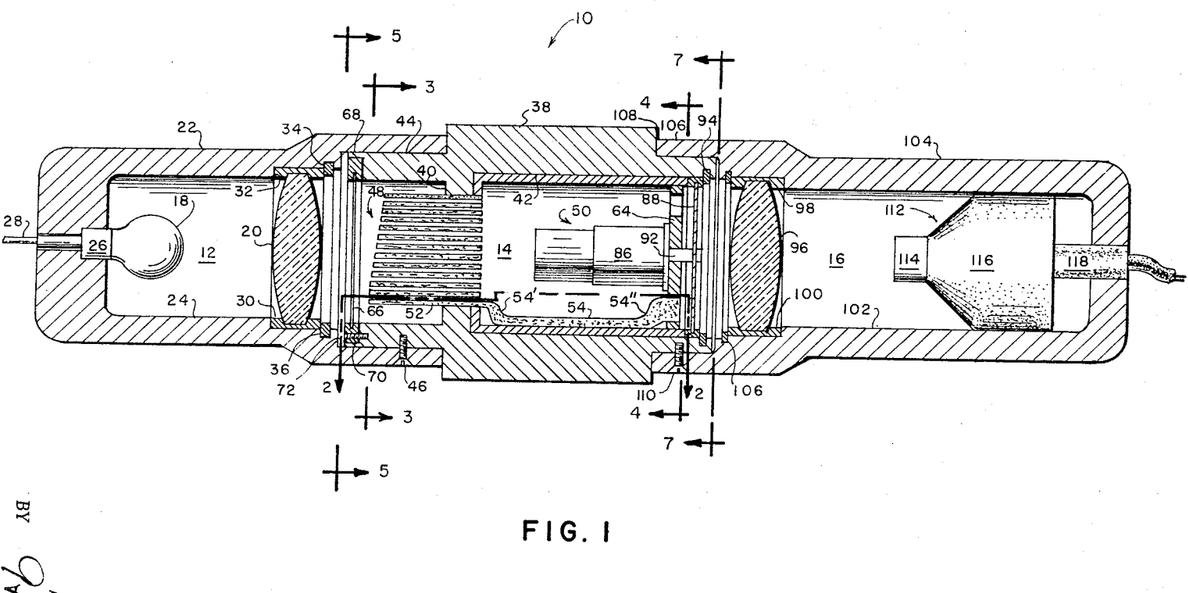
FIGURE 1 is a longitudinal sectional view, partially in elevation, of one embodiment of the invention.

With continued reference to the accompanying figures wherein like numerals designate similar parts throughout the various views, and with initial attention directed to FIGURE 1, reference numeral 10 designates a fiber optical photo-electric vibratory instrument constructed in accordance with this invention. For purposes of explaining the construction of the present invention it can be assumed that the vibratory instrument 10 consists of three main units. Namely; an illuminating unit 12, a fiber optical spectrum transducer and synchronous unit 14, and a photo-electric analysis unit 16.

The illuminating unit 12 can be further broken down into a source of light or illumination 18, which for purposes of simplicity is shown in the form of an incandescent lamp, and a transparent focusing lens element 20. For purposes of protection and for concentrating the light upon the lens element 20, the source of illumination 18 is housed within a hollow U or cup-shaped housing 22 which is flared out at the open end thereof for fitting over the transducer and synchronous unit 14 in a manner that will be more fully explained hereinafter. The inner surface 24 of the housing 22 can be coated with a light reflectant material to increase the efficiency of the source of illumination 18 if such is deemed desirable. A suitable socket 26 for holding the source of illumination and a terminal unit 28 for connecting the socket to an energizing source of current are provided in the closed end of the U shaped housing 22.

The lens element 20 is of the type which receives the diverging light rays from the source of illumination 18 and collimates them into a wide, evenly concentrated beam directed parallel to the longitudinal axis of the lens. For purposes of mounting, the lens element 20 may be clamped within a ring 30 and slipped into a recess 32 formed on the open end of the inner surface 24. The ring 30 is held within the recess 32 by means of an O-ring or clamp 34 that is positioned within a second recess 36 formed in the open end of the housing 22.

The fiber optical spectrum transducer and synchronous unit 14 is housed within a hollow, opaque enclosure 38 that has a flange 40 formed on the inner surface 42 thereof. The end 44 of the enclosure 38 is turned down for receiving the flared out end of the illuminating unit 12 in the manner shown in FIGURE 1. A plurality of screws or other suitable fastening elements 46 (only one of which is shown for purposes of clarity) is employed for securing the illuminating and transducer units together.

The fiber optical spectrum transducer and synchronous unit 14 housed within the enclosure 38 is comprised of fiber optical spectrum transducer and a synchronous or commutator unit, generally indicated at 48 and 50, respectively. Basically the transducer 48 consists of an array of illumination conducting vibratory elements 52 of the optical fiber type (see FIGURE 6), a large number of which are grouped together into a bundle to form a light transmitting tube 54. The vibratory instrument in its preferred form employs a plurality of these light transmitting tubes 54 located within the enclosure 38, but for reasons of clarity only one such tube has been illustrated in its entirety in FIGURE 1. Each of the fibers 52 can be made to extend the full length of the tube, in which case they are bound together at their middle 54′ and compacted end 54″ by means of a suitable binding such as a plastic resin, adhesive, cement, or the like. In actual practice, however, it has been found to be much easier to form the cantilevered and bundle portions of the transducer as separate unit which are later butted together thereby forming in effect a plurality of continuous fibers.

Each of the fibers 52 are formed of a light transmitting material such as glass. Alternatively, other light transmitting materials made of a synthetic material of the so-called plastic type may be substituted. But in the instant case glass is preferred since it possesses better illumination transmitting properties than can presently be obtained from the synthetic plastics that are currently available.

An outside coating 55, such as a second layer of glass, resin or clear instrument lacquer of a conventional nature, is applied to the exterior of each fiber for preventing the loss of light through the sides thereof.

When glass fibers are used the light-conducting core should have a high refractive index (being somewhere in the order of 1.70) and the light reflecting coating 55 should be of a low refractive index, as for example approximately 1.5, which thereby prevents the passage of light rays through the sides of the coated fiber thus causing them to be transmitted through the length of the fibers. Each fiber 52 is highly flexible and is quite thin in cross-section, being preferably somewhere in the order of .001 to .002 of an inch in diameter. Obviously, the diameter may vary considerably but in this case one preferred diameter range is given.

Figure 2:
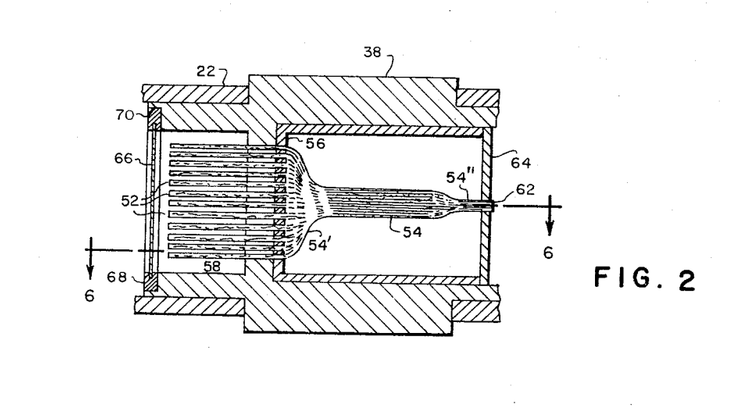
FIGURE 2 is a longitudinal view of one of the fiber optical transducers taken along line 2—2 of FIGURE 1.
Figure 3:
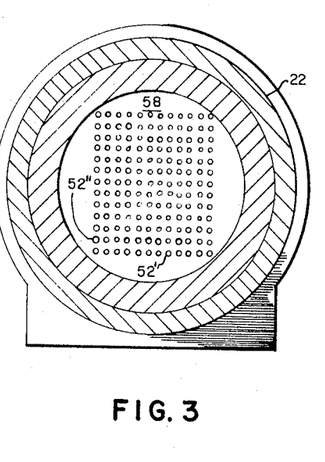
FIGURE 3 is a cross-sectional view taken along line 3—3 of FIGURE 1 showing an end view of the unloaded cantilever fiber optical spectrum transducers.

The end of the fiber optical bundle 54 adjacent to the lens element 20, as well as all the ends of the various other bundles which are not illustrated but are embodied in the vibratory instrument 10, is "flared out" or otherwise spread apart in the manner shown in FIGURE 2 so that each fiber 52 of the bundle is arranged in a side-by-side relationship to form rows (the first two rows of which are illustrated at 52′ and 52″, respectively, in FIGURE 3). The axes of the various fibers making up the rows are positioned parallel to the light rays passing through the lens 20 which are, in turn, parallel to the plane of the longitudinal axis of the vibratory instrument 10. Each individual fiber 52 is secured by suitable means within a supporting harness 56 so that the main portion of the free end of the fibers extends into the cavity 58 within the chamber 38.

As can be seen, the fibers 52 when suspended by one end form unloaded cantilever beams that are free to vibrate at their resonant frequency. As is well known, the normal resonant frequency of an unloaded cantilever beam of this general type is determined primarily by the diameter and length of the beam itself. Since the vibratory instrument 10 is to operate over an extended frequency range, each successive row of fibers (see FIGURE 1) is cut to a progressively shorter length to thereby change their resonant frequency. The same change in resonant frequency of each row could also be obtained by varying the diameter of the fibers used in each row while holding their length constant or by a molding technique which will be more fully explained hereinafter.

Figure 4:
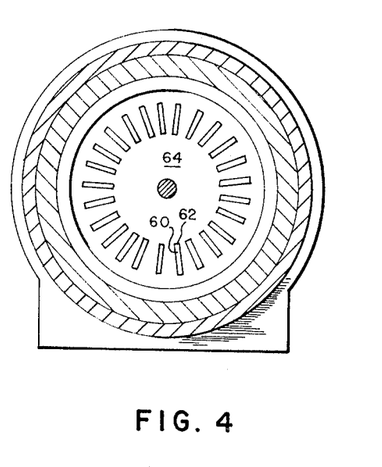
FIGURE 4 is a cross-sectional view taken along line 4—4 of FIGURE 1 showing the fiber optical harness of this invention.

The other end 60 of the fiber optical bundle 54 is compressed into a substantially rectangular shape (see FIGURE 4) and bonded within an aperture 62 formed in a second harness 64. For purposes of illustration, twenty-five such apertures are formed in the harness 64 for receiving the rectangular ends of twenty-five separate fiber optical bundles similar to the bundle 54 shown in FIGURE 1. Thus there will be twenty-five parallel rows of fibers positioned within the cavity 58 (although fewer than this number has been shown for purposes of clarity), the free end of each successive one of which is cut slightly shorter than the preceding row and suspended in a cantilevered manner for detecting vibration at different frequencies. In the illustrated instrument the vibration frequency range covered is between 100 and 2500 c.p.s. in 100 cycle increments. Obviously both the range and/or the frequency band can easily be changed, as by using ⅓ active increment steps in the range of the instrument, if such is found to be desirable or necessary.

Figure 5:
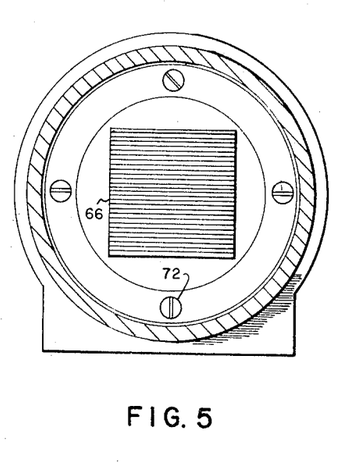
FIGURE 5 is a cross-sectional view taken along line 5—5 of FIGURE 1 showing one type of optical mask employed in the invention.

For purposes of controlling the amount of illumination that strikes the free end of the optical fibers 52, and thus the amount of illumination that they transmit to their fixed ends 60, an optical mask 66 (see FIGURE 1) is placed between the lens element 20 and the free end of the array. This optical mask is normally embedded in a ring 68 which, in turn, is secured within a recess 70 in the end of the chamber 38 by suitable fastening means 72. FIGURE 5 illustrates the general appearance of one type of optical mask that has been found especially well adapted for use with the present vibratory instrument.

Figure 6:
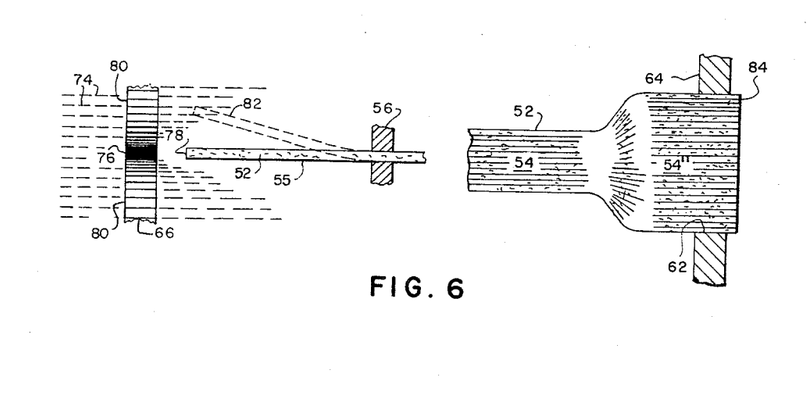
FIGURE 6 is an enlarged pictorial view taken along line 6—6 of FIGURE 2 illustrating the optical mask and a fiber optical transducer located in operating position therebehind.

FIGURE 6 pictorially illustrates the construction and operation of the optical mask 66 in combination with one of the cantilevered optical fibers 52. As is apparent the mask 66 must be shaded in such a manner that the amount of illumination (here represented by the broken lines 74) passing through the fiber is proportional to the amplitude of vibration of the optical fiber 52. In the present instance, the optical mask is of a so-called "gray scale" type. This type of scale is made so that the transmission of illumination therethrough increases linearly from the center of the mask (as determined by the rest position or the optical fiber 52) outwardly. By the mask being so designed the amount of illumination striking the free end of the optical fiber as the optical fiber moves from its static or normal rest position gradually increases and is thus proportional to the amplitude of vibration to which the instrument is subjected.

As seen in FIGURE 6, the opaque or darkest part 76 of the mask 66 is directly between the source of illumination (in this case the lamp 18 and the lens element 20 as shown in FIGURE 1) and the free end 78 of the optical fiber 52 which is at rest. Thus, while the optical fiber 52 is in this position little or no illumination will strike its free end 78 and, therefore, no light will be transmitted through the fiber to its embedded end 84. However, as the optical fiber 52 is subjected to a vibration which is at or near its resident frequency it will be set into vibration and, as the vibration increases, the free end 78 will be progressively moved from behind the dark part 76 toward the perfectly transparent portions 80 of the mask 66. For purposes of illustration the maximum swing of the optical fiber 52 in one direction has been illustrated by use of the broken lines 82. It is to be realized, however, that an equal swing in the opposite direction will also occur during each cycle of the fiber.

It is readily seen from this that the amount of illumination striking the free end 78 of the optical fiber 52, and thus the illumination that will ultimately be transmitted through each fiber, is dependent upon the position of the free end thereof with respect to the optical mask 66. As the amplitude of vibration of each optical fiber making up the bundle 54 increases their free ends will move from behind the opaque portions of the mask 66 and toward the clear portion thereof, thus exposing the free ends to an increasing amount of illumination. Since the transparency of the optical mass 66 gradually increases from the center outward toward a point as far as the optical fibers normally moves during maximum vibration, the amount or amplitude of vibration to which tuned each row of fibers is being subjected is easily obtained by simply monitoring the illumination transmitted through the particular fiber optical bundle 54 that is made up by the vibrating fibers.

Figure 7:
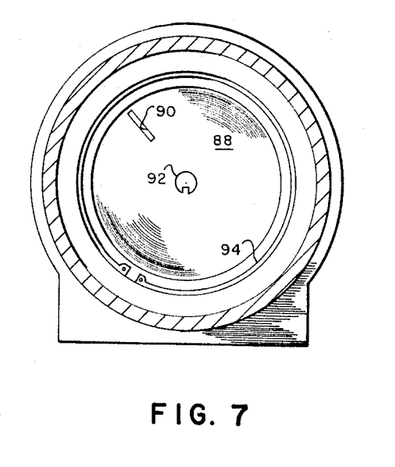
FIGURE 7 is a cross-sectional view taken along line 7—7 of FIGURE 1 showing the synchronous gate employed in the present invention.

In view of the fact that there are preferably a plurality of fiber optical bundles 54 incorporated into each vibratory instrument 10, a system whereby only one bundle or channel, and the illumination being transmitted therethrough, can be sampled at any one given period of time must be provided. Such a commutation is accomplished by the synchronous unit 50. This unit consists of a 60 c.p.s. synchronous motor 86 and suitable power supply (see FIGURE 1) which is mounted on the back of the fiber optical harness 64. A rotatable opaque or shield 88 (see FIGURE 7), which has a single rectangular aperture 90 formed therein that corresponds in size and location with the rectangular shaped ends of the optical bundles 54 held by the harness 64, is connected to the motor 86 by means of a keyed shaft 92. An O-ring or other suitable clamp 94 is normally employed for holding the gate 88 in place on the keyed shaft 92.

The photo-electric analysis unit 16, which follows the synchronous unit 50 and is synchronized therewith to provide a usable train of synchronized output signals, is comprised of a focusing lens element 96 that is held in a clamp ring 98 and secured within a recess 100 formed on the inner surface 102 of the U or cup shaped housing 104 by an O-ring or like clamping element 106. The housing 104 is secured over the turned down end 108 of the enclosure 38 by means of a screw or other suitable fastening means 110.

An illumination sensing circuit 112 is located immediately behind the lens element 96 and consists of a photo-responsive detector 114 coupled through an amplifier circuit 116 to an output terminal 118. The optical requirements placed on the lens element 96 will, obviously, be a function of the characteristics of the illumination sensing circuit 112 upon which it must focus the illumination emitted from the rectangular shaped ends of the fiber optical bundle 54. In the illustrative configuration the photoresponsive detector 114 is positioned within the housing 104 so that the lens element must focus the entire light conveyor assembly of twenty-five fiber optical bundles onto an area approximately 0.00003 inch square. The amplifier circuit 116 is preferably of the transistorized type which provides a buffer output with voltage and impedance characteristics compatible with common telemetry requirements.

The general operation of the vibratory instrument 10 can be explained in substantially the following manner:

Once the vibratory instrument is positioned against or on the system or vehicle to be tested, the proper power and telemetry connections are made to the illuminating and photo-electric analysis units 12 and 16, respectively. With the source of illumination 18 lit, the face of the optical mask 66 will be evenly illuminated through the lens element 20. However, due to the construction of the mask 66, as explained more fully hereinabove in reference to FIGURE 6, only those rows of fibers 52 which have been excited from their stationary position of rest by the vibration of the system under test will be exposed at their free end to the illumination. The illumination picked up by these vibrating fibers is transmitted through the fiber optical bundles 54 to the rotating gate 88 which is being driven by the energized electric synchronous motor 86. As the aperture 90 of the gate 88 is successively aligned with the ends of the bundle 54, and the output of the instrument 10 is thus synchronized into a train of pulses, the illumination emitted from the bundle will pass through lens element 96 and be focused onto the photo-detection circuit 114. The photo-detection circuit will in turn analyze the intensity of the illumination received from each bundle 54 and, since the intensity of the illumination thus transmitted is directly proportional to the intensity of the vibration, will indicate both the frequency (by virtue of the row of fibers being sampled at that moment) and amplitude of vibration to which the instrument is presently being subjected.

Figure 8:
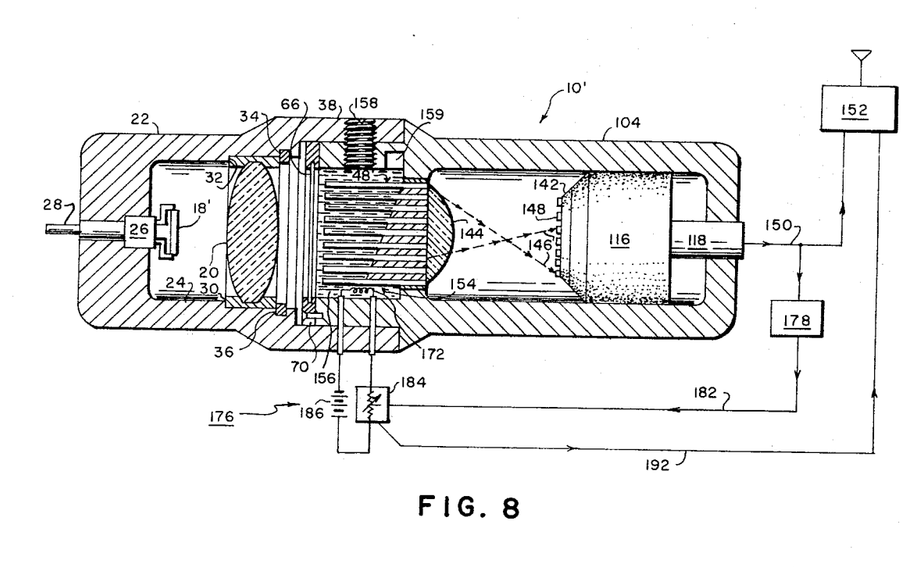
FIGURE 8 is a longitudinal sectional view, partially in elevation and block form, illustrating a second embodiment of the invention.

In certain instances it has been found desirable to modify the vibration detecting instrument 10 shown in FIGURE 1 for use where very severe vibration of a high and varying intensity is to be encountered over a wide spectrum range. FIGURE 8 illustrates certain modifications that can be made to a vibratory instrument 10', which also employs fiber optic transducer elements as vibration sensors, to not only increase its ruggedness but to also further reduce its size, weight and increase its usefulness. In the modified instrument 10', the illuminating source 18 of the basic instrument has been replaced by a continuous illuminating solid state semiconductor 18' of the so called "laser" type. Such a laser 18' can be made of gallium arsenide which has the property of converting electrical energy into light energy with an efficiency of over 90% being theoretically attainable. The by-products of the use of such a continuous illuminating laser is that a highly efficient miniaturized lighting system is obtained which, in turn, permits a decrease in weight, size and power consumption of the instrument.

Figure 9:
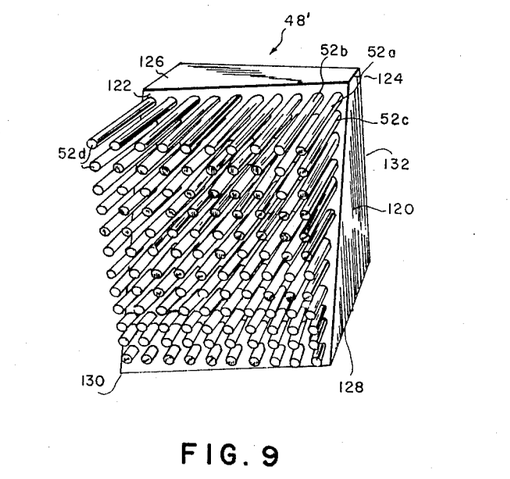
FIGURE 9 is a perspective view of the molded block type fiber optic transducer utilized in the modified vibration detecting and indicating instrument of FIGURE 8.

The fiber optic spectrum transducer 48' of the vibratory instrument 10' consists of a molded block 120 (see FIGURE 9) to which the various optic fibers 52 are extended in a cantilevered manner. As can be seen in FIGURE 9, the block 120 takes the form of a frustrum rectangular parallelepiped which is formed by the face plane 122 cutting through the block in such a manner as to intersect the four corners 124–130 of the block at progressively further distances from the back face 132 thereof. Since the free ends of the fibers 52 all lie in a single plane that is parallel with the back face 132 of the block, the effective length or cantilevered portion of each individual fiber in each row becomes progressively shorter from right to left and from top to bottom. For example, the fiber 52a is slightly longer in length than the next fiber 52b in the row, and fiber 52c, which is the longest fiber in the next adjacent row, is slightly shorter in length than fiber 52d which is the shortest fiber in the top row.

Figure 10:
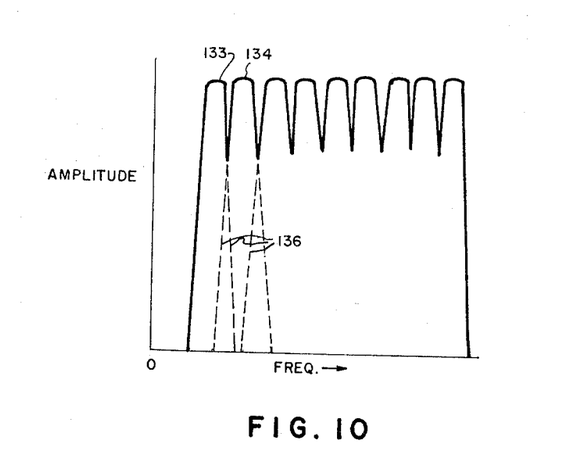
FIGURE 10 is a graph illustrating the frequency characteristics of a fiber optical bundle.
Figure 11:
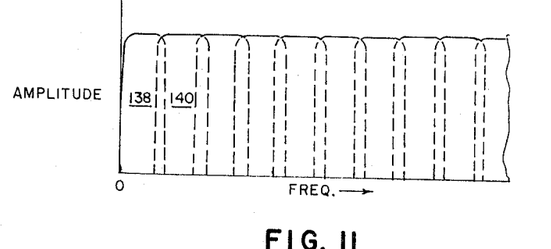
FIGURE 11 is a graph illustrating the frequency coverage of a vibration detecting and indicating instrument constructed in accordance with this invention.

Thus, with each fiber in a given row having a different effective length, it is readily seen that each fiber will be excited by or responsive to slightly different frequencies of vibration thereby in effect broadening the band width of the row over what would be produced if each fiber in the row was of the same length. This expanded band width of a single row of fibers is shown graphically in FIGURE 10 wherein the frequency response of the optic fibers 52a and 52b are shown at 133 and 134, respectively. As can be seen these frequencies slightly overlap at their base (as represented by the broken lines 136). FIGURE 11 illustrates how the band width of various rows of fibers overlap one another to afford complete coverage of a given frequency with the band width of the upper row of fibers, which includes fibers 52a and 52b, being indicated at 138 and the next adjacent lower row at 140.

For purposes of focusing the light transmitted through the fibers 52 upon a photosensitive image dissector 142, which will be described in detail hereinafter, either a cylindrical or spherical lens 144 is secured adjacent to or against the back face 132 of the block 120. As the rays of light, as pictorially represented by the broken lines 146, from the rows of fibers 52 pass through the cylindrical lens 144 they will be bent until they are focused on a given area of the face 148 of the photosensitive image dissector 142. The lens thus in effect replaces the fiber optical bundles 154 used in the instrument described in FIGURE 1 thereby permitting the unit to be made in a smaller, lighter package and at less cost per unit.

The photo-electric analysis unit 16 of the vibratory instrument 10 shown in FIGURE 1 has also been modified and now takes the form of a photosensitive image dissector 142 which consists of a mosaic of extremely small solid-state photoelectric cells (phototransistors) 148, each of which may contain a microelectric amplifier. These photo-electric cells 148 are formed into rows corresponding with the rows of optic fibers 52 and are positioned individually so that at least one cell will be centered in the "beam" of light rays 146 coming from the embedded end of each fiber through the cylindrical lens 144.

The image dissector 142 functions much like a "screened" photograph does when it is printed in that the dissector fractionalizes the image impinging upon it into components equal in number to the number of photoelectric cells making up the dissector. Each cell responds to the intensity of the light impinging upon it and the resulting signals produced by the light rays are amplified by the aforementioned microelectric amplifiers. An electric scanning circuit (not shown) which is capable of sampling the output of each individual cell, or rows of cells if such is desired, in a predetermined sequence is electrically connected to each cell and is synchronized with the output of the instrument to give a coded pulse train output in much the same manner described hereinabove in reference to FIGURE 1. The output signals of the dissector consisting of these scanned outputs of the photoelectric cells 146 is then applied through the amplifier 116 (when such additional amplification is needed) and lead out 150 to a transmitter or recorder unit 152.

For purposes of extending the operating range of the laboratory instrument 10' it has been found desirable to provide a method or means whereby the flexibility of the optic fibers 52 can be varied. This variation in the flexibility of the fibers is desirable since the mechanical Q factor or sensitivity of the optical fibers 52 is relatively high (generally optical fibers made of glass have a Q of over 150). This high mechanical Q of the optic fibers make them susceptible to being overdriven by vibration of extreme intensities which, in turn, results in the fibers being damaged and erroneous information transmitted from the instrument. It has been found that one method by which the Q factor of the optic fibers can be lowered is to dampen or "stiffen" the cantilevered portion of the fibers. This is done in the present instance by immersing at least a portion of each individual fiber in a fluid. This is done by filling a fluid type chamber 154, which is formed by the opaque housing 38, spectrum transducer 48' and optical mask 66, with a clear fluid 156. This fluid can be of any type having the required optical properties and viscosity rating, and which will operate properly in the environment to be encountered. The clear alcohols, fluoro chemicals, silicon oils, etc., are examples of the various groups of fluids which have been found acceptable for use as a dampening fluid in the vibratory instrument 10'.

As will be readily apparent, the placing of the vibration responsive fibers 52 within a fluid acts to reduce the mechanical Q of the fibers by an amount proportional to the viscosity of the fluid. Therefore, the "thicker" the fluid 156 is the greater will be the dampening effect of the fluid upon the fibers 52 and the lower will be the Q factor of the vibratory instrument 10'. Obviously the converse is true and the Q factor of the instrument will approach its maximum value as the fluid becomes "thinner."

The dampening fluid 156 can be permanently "built" into the instrument when it is being constructed although this somewhat restricts the sensitivity range of the instrument 10' to a specific level. As might be expected, it has been found desirable to build as much flexibility into the instrument as is possible. This can be done in the present instance by providing a removable plug 158 in the chamber 154 through which a fluid can be added or removed from the chamber thereby permitting the fluid to be placed in the instrument only when it is found desirable to lower the Q factor of the instrument. This feature not only permits the fluid to be omitted from the instrument, thus making available the full sensitivity of the instrument, but it also permits various dampening fluids having different viscosity levels to be used thereby giving the user of the instrument a wide discretion in adjusting the Q factor thereof to fit the particular environment in which the instrument is to be employed at any given time. An expansion chamber 159 is provided with the enclosure 154 for purposes of compensating for any expansion or contraction of the liquid 156 during the use of the instrument 10'.

Although the use of various interchangeable liquids for adjusting the Q factor of the instrument will provide excellent results, it has been found that certain uses to which the vibratory instrument 10' may be placed requires that the instrument have what can be called a "variable Q factor." One example of such an instance is where the vibratory instrument 10' is to be carried on a launch vehicle to monitor the vibration encountered as the vehicle accelerates.

Figure 12:
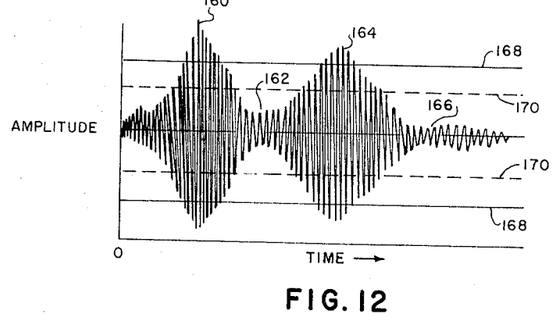
FIGURE 12 is a graphic illustration of the vibration normally encountered by a vibration detecting instrument carried on board a rocket powered launch vehicle.

FIGURE 12 illustrates a typical vibration pattern encountered during the lift-off and acceleration periods of a rocket powered launch vehicle. As can be seen, the vibration builds up to its maximum intensity shortly after lift-off, as represented at 160, then decreases to a moderate level 162 before again increasing to the level 164 as the vehicle passes Mach 1 in velocity. The vibration of the vehicle then normally tends to stabilize or become relatively constant at the level 166 if the vehicle is aerodynamically stable. The limited telemetry band width allotted to a vibration measuring within the vehicle is represented by the solid lines 168 in FIGURE 12 while the linear sensitivity or preferred operating range of the vibratory instrument 10' is represented by the broken lines 170.

As is readily apparent, the peak vibration periods 160 and 164 fall outside the telemetry band width thus causing this highly important information to be lost through the clipping action of the telemetry equipment. Furthermore, it is seen that a vast portion of the severe vibration periods, which is of the most interest and important to the engineers concern, fall outside the preferred operating range of the instrument thereby further reducing the quality of the transmitted information.

To overcome this clipping of the information generated during the peak periods of vibration, and to maintain the operation of the vibratory instrument 10' well within its preferred range, a control element 172 (FIGURE 8) is provided within the enclosure 154 for varying the mechanical Q factor or sensitivity of the instrument by varying the temperature and thus the viscosity or "thickness" of the dampening liquid 156. For purposes of illustration, the element 172 is shown as a resistance type heating element although it is to be realized that a cooling, or combined heating and cooling element, could be utilized to adjust the viscosity of the liquid 156 to a given value through its internal temperature. If desired, the vibratory instrument 10' can be emerged in a liquid bath to maintain the temperature of the fluid 156 at such a level that without the heat furnished by element 172 the viscosity of the fluid will be at its lowest predetermined value.

Figure 13:
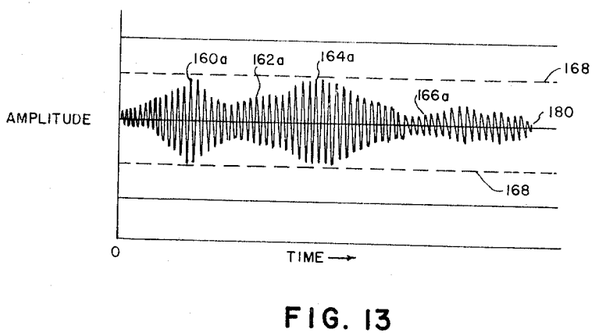
FIGURE 13 is a graph illustrating the vibration intensity detected and read out by an instrument constructed in accordance with the second embodiment of this invention.

A control system, generally indicated at 176, is provided for regulating or maintaining the sensitivity of the vibratory instrument 10' within a given level by adjusting the heat transferred from the element 172 to the liquid 156. This control system 176 consists of an amplitude detector circuit 178 that senses when the amplitude of the output signal 180 (see FIGURE 13) from the vibratory instrument 10' is approaching or exceeding a given level. For purposes of illustration these levels are selected as the upper preferred operating level of the instrument, as represented by the broken lines 170, and the lower or cutoff level as represented by the baseline in FIGURES 12 and 13. The output produced by the amplitude detector circuit 178 is fed through an electrical conductor 182 to a control unit 184 which is connected in series between a source of current 186 and the control element 172. The control unit 184 is responsive to the output of the detector circuit 178 and functions to control the temperature of the element 172 by varying the current (as represented by the solid line 188 of FIGURE 14) applied thereto.

Thus, as the vibration sensed by the vibratory instrument 10' increases (see FIGURES 12 and 13), thereby causing the output signal 180 of the instrument to approach the upper preferred or sensitivity level 170 of the instrument, the amplitude detector circuit 178 will sense this condition and feed a control signal via conductor 182 to the control unit 184. The control unit will respond to this control signal by adjusting the current, as represented by line 188 in FIGURE 14, flowing through the control element 172. The change in current flowing through the element 172 functions in such a manner as to change the temperature of the fluid 156 by a sufficient amount to increase the viscosity exhibited by the fluid, and thus decrease the sensitivity of the instrument as pictorially represented by the broken line 190. On the other hand, if the vibration to which the instrument is subjected suddenly decreases (as shown at 166 in FIGURE 12), then the signal from the detector circuit 178 will cause more current to flow through the element 172 (see 166b of FIGURE 14) thereby decreasing the viscosity of the liquid 156 thus increasing the mechanical Q or sensitivity of the instrument as shown at 166c of FIGURE 14. This substantially increases the operating range of the instrument over that which would otherwise be possible.

Figure 14:
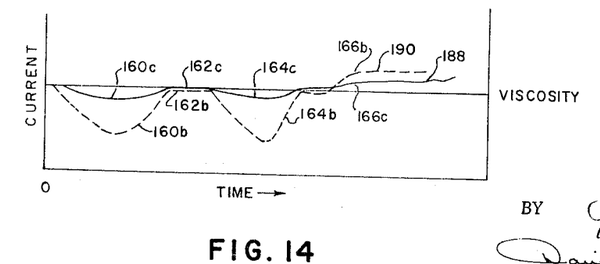
FIGURE 14 is a graph illustrating the variation in the viscosity of the damping liquid, and thus the mechanical Q of the vibration detecting instrument, that results as the control current applied to the control element is varied.

Thus, it may be seen in FIGURE 14 how a change in the current passing through element 172, as represented by the line 188, causes a corresponding change in the dampening effect of the liquid 156 upon the cantilevered portion of the fibers 52. By simultaneously comparing the graphs of FIGURES 12 through 14 it can be seen that the Q factor of the vibratory instrument 10' can be varied so that the instrument is never required to either operate above or below a predetermined sensitivity level. Therefore, the peak intensity levels of vibration, as shown at 160 and 164 of FIGURE 12, are reduced to the level shown at 160a and 164a of FIGURE 13 through the simultaneous decrease in the sensitivity of the instrument 10', as represented at 160b and 164b in FIGURE 14, while the low levels of vibration (162 and 166) are effectively amplified as shown at 162a and 166a by increasing the sensitivity of the instrument.

For purposes of determining the amount by which the sensitivity of the vibratory instrument 10' is changed or has changed over a given increment of time, and thereby establish a base upon which the information transmitted or recorded by the unit 152 can be properly and accurately interpreted, an output signal is taken from the control unit 184 and fed into the unit 152 through an electrical conductor 192. Thus by knowing the sensitivity of the instrument and vibration recorded thereby at any given instant, the intensity of the vibration to which the vibratory instrument is being subjected can easily be determined.

Figure 15:
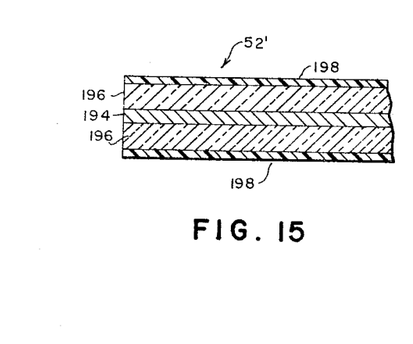
FIGURES 15 and 16 are enlarged cross-sectional views of a modified vibration transducer element consisting of combined metal and fiber optic vibration sensitive reeds.

In those applications where a liquid cannot be used as a dampening medium, the mechanical Q of the optic fibers used in the vibratory instrument can be adjusted by employing a strip of material attached to or embedded within the fiber. FIGURE 15 illustrates the use of a metal vibration responsive reed 194 encased or embedded within a glass optical medium 196. The reflective coating of the illumination transmitting medium 196 is shown at 198 and can be of the lacquer or glass type depending upon which is found to be most desirable. As will be apparent, the metal reed 194 serves to adjust the mechanical Q of the optical fiber 52' while the glass optic medium 196 acts as a conduit to transmit the light striking the end of the fiber to the photodetector unit of the vibration instrument.

Figure 16:
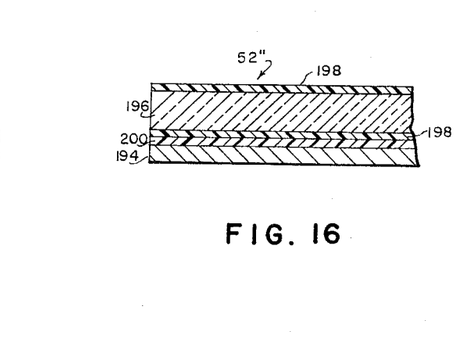

FIGURE 16 illustrates an optic fiber 52" in which the metal reed 194 is secured to the outer surface of the optic medium 196 by any suitable method such as by the use of a bonding agent 200. Again the incorporation of the metal reed to the optic fiber 52" provides a way by which the extremely high mechanical Q of a glass fiber can be lowered if such is desirable. Obviously the length and diameter of the metal reed, as well as the material from which it is formed (which need not be metal but could be any suitable material), can be varied to give the fibers any desired sensitivity level.

In certain instances it may be desirable to further modify the vibratory instrument 10' as by replacing the single source of illumination 18' with a plurality of sources. Such could readily be accomplished and the lens element 20 could be omitted if a source of illumination such as, for example, a single bulb for each fiber 52 were employed and/or a diffusing material was substituted for the lens element. In any case the illumination presented over the entire face of the optical mask 66 should be as uniform in intensity as possible. As far as the optical mask 66 is concerned it could be replaced by any mask that is shaded in such a manner so that the amount of light passing through the fibers is proportional to the amplitude of vibration. Furthermore, the output from each fiber could feed directly into the mosaic photo-detector 142 thus eliminating the use of lens element 144 if such were desirable.

From the foregoing it can be seen that a vibratory instrument which is vastly superior to prior known art devices has been produced. By using a fiber optical transducer, a highly accurate, rugged instrument having a very fast response time and low threshold excitation level has been provided for the first time. Furthermore, the use of such a transducer has permitted the vibratory instrument to be made extremely small (less than five cubic inches for an instrument of the type illustrated in FIGURE 1 and having a response range of from 100 to 2500 c.p.s.), light, rugged and especially well adapted for telemetry application. The size, weight, versatility, ruggedness and telemetry qualities of this fiber optical vibratory instrument have been found especially advantageous in the aerospace field where reliability, size, weight and compatibility are premium attributes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fiber optic vibration responsive instrument for detecting vibration within a predetermined frequency band, comprising:
   (a) support means;
   (b) a plurality of illumination conducting vibratory elements mounted through said support means and suspended in a cantilever manner from at least the first surface thereof,
      each of said vibratory elements being adapted to resonate at a different frequency within said predetermined frequency band;
   (c) illuminating means mounted adjacent the free end of the cantilevered portion of said vibratory elements;
   (d) masking means positioned between said illuminating means and said free ends of said vibratory elements,
      said masking means being adapted to shield said free ends from said illuminating means when said vibratory elements are at rest;
   (e) illumination sensing means operatively associated with the other ends of said vibratory elements for sensing and producing an output signal when illumination is transmitted therethrough from said free ends thereby giving an indication as to when said vibratory elements are being subjected to a vibration of the frequency to be detected and are thus vibrating; and
   (f) commutator means operably associated with said illumination sensing means for selectively coupling the illumination transmitted by the various ones of said vibratory elements to said illumination sensing means whereby information as to the condition of individual ones of said vibratory elements is obtainable in the coded output signal from said instrument.

2. A fiber optic vibration responsive instrument according to claim 1 wherein said vibratory elements consist of at least one light-conducting fiber comprised of a light-transmitting core of a material of relatively high refractive index having a light-insulating material of relatively low refractive index clad thereon.

3. A fiber optic vibration responsive instrument according to claim 1 wherein said illumination sensing means is a photoresponsive system.

4. A fiber optic vibration responsive instrument according to claim 3 wherein said commutator means is a movable opaque shield having an aperture formed therein,
   said aperture being selectively aligned between selected ones of said other ends of said vibratory elements and said illumination sensing means as said shield is moved so that illumination freely passes therethrough and strikes upon said photoresponsive system thereby producing an output signal.

5. A fiber optic vibration responsive intsrument according to claim 4 wherein said photoresponsive system is a photoelectric cell.

6. A fiber optic vibratory responsive instrument according to claim 5 wherein a lens system is positioned between said movable shield and said photoelectric cell for focusing the illumination from said other ends of said vibratory elements upon said cell.

7. A fiber optic vibration responsive instrument according to claim 3 wherein said photoresponsive system consists of at least one photoelectric cell operatively associated with each of said vibratory elements.

8. A fiber optic vibratory responsive instrument according to claim 7 wherein said commutator means includes electrical switching means for selectively connecting various ones of said photoelectric cells to the output of said instrument.

9. A fiber optic vibration responsive instrument according to claim 8 wherein a lens system is positioned between said other ends of said vibratory elements and said photoelectric cells for focusing the illumination from said other ends upon the corresponding individual cells.

10. A fiber optic vibration responsive instrument according to claim 1 wherein said support means is formed around said vibratory elements with the first surface thereof being shaped to form a substantially frustrum rectangular parallelepiped with the free ends of said vibratory elements lying in a single plane whereby the length of the cantilevered portion of said vibratory elements is progressively varied.

11. A fiber optic vibration responsive instrument according to claim 1 wherein a lens system is positioned between said illuminating means and said masking means for collimating the illumination from said illuminating means upon said masking means so that said masking means is evenly illuminated.

12. A fiber optic vibration responsive instrument according to claim 1 wherein said illuminating means consists of an individual source of illumination associated with the free end of each of said vibratory elements.

13. A fiber optic vibration responsive instrument according to claim 1 wherein said other ends of said vibratory elements are operatively connected to said illumination sensing means through a fiber optic bundle.

14. A vibration responsive instrument for detecting vibration within a predetermined frequency band, comprising:
   (a) support means;
   (b) at least one illumination conducting vibration responsive element mounted by one end in a cantilevered manner through said support means;
   (c) illuminating means positioned adjacent the free end of said cantilevered element for supplying illumination to said free end thereby causing illumination to be conducted through said element;
   (d) masking means positioned between said illuminating means and said free end of said cantilevered element for shielding the illumination from said free end when said cantilevered element is at rest;
   (e) housing means positioned about said cantilevered element and cooperating with said support means and said masking means to form a container around said element;

(f) fluid means located within said container for immersing at least a portion of said cantilevered element thereby lowering the sensitivity of said element to vibration; and
(g) illumination detecting means positioned adjacent the mounted end of said cantilevered element for detecting and producing an output signal from said instrument proportional to the amount of illumination that is conducted through said cantilevered element thereby giving an indication as to when said cantilevered element is being subjected to a vibration force of the frequency to be detected;
(h) means in said container for withdrawing said fluid means from around said cantilevered element when the sensitivity of said cantilevered to vibration forces occurring within said frequency band is to be increased;
(i) said masking means is of the type that permits gradually greater amounts of illumination to pass therethrough from the center of the mask, as determined from the rest position of said free end of said cantilevered element, outwardly whereby the amount of illumination conducted through said cantilevered element is dependent upon the vibration force within said predetermined frequency band to which said instrument is being subjected; and
(j) temperature modifying means associated with said fluid means for selectively adjusting the internal temperature of said fluid means so that the viscosity thereof is changed thereby modifying the sensitivity of said cantilevered element to vibration forces within said predetermined frequency band.

15. A vibration responsive instrument according to claim 14 wherein said temperature modifying means is a heating element and associated control means.

16. A vibration responsive instrument according to claim 14 wherein control system means is connected between the output of said instrument and said temperature modifying means for adjusting the output of said temperature modifying means in accordance with the output signal from said instrument thereby maintaining the sensitivity of said cantilevered element within a preferred operating range.

17. A vibration responsive instrument according to claim 16 wherein the output signal from said instrument and a control output signal from said control system are operatively connected to a readout system for depicting the amplitude of vibration and the sensitivity of said cantilevered element, respectively, to vibration forces within said predetermined frequency band thereby indicating the vibration force to which said instrument is being subjected.

References Cited by the Examiner

UNITED STATES PATENTS

| 3,146,057 | 8/1964 | Rona | 73—70.2 X |
| 3,167,965 | 2/1965 | Peterson | 73—492 |
| 3,213,197 | 10/1965 | Hawkins. | |
| 3,224,279 | 12/1965 | Galli et al. | 73—517 |

FOREIGN PATENTS

| 1,234,287 | 5/1960 | France. |
| 445,470 | 6/1927 | Germany. |

RICHARD C. QUEISSER, *Primary Examiner.*

JAMES J. GILL, *Examiner.*